United States Patent [19]
Berthold

[11] Patent Number: 5,956,218
[45] Date of Patent: Sep. 21, 1999

[54] EARTH-LEAKAGE CIRCUIT BREAKER WITH AUTOMATIC MONITORING CAPABILITY

[75] Inventor: Rainer Berthold, Gaiberg, Germany

[73] Assignee: AEG Niederspannungstechnik GmbH & Co. KG, Neumunster, Germany

[21] Appl. No.: 08/793,407

[22] PCT Filed: Aug. 24, 1995

[86] PCT No.: PCT/DE95/01129

§ 371 Date: May 6, 1997

§ 102(e) Date: May 6, 1997

[87] PCT Pub. No.: WO96/06475

PCT Pub. Date: Feb. 29, 1996

[30]     Foreign Application Priority Data

| Aug. 24, 1994 | [DE] | Germany | 44 29 949 |
| Jul. 31, 1995 | [DE] | Germany | 195 28 019 |
| Jul. 31, 1995 | [DE] | Germany | 195 28 020 |
| Aug. 7, 1995 | [DE] | Germany | 195 28 918 |

[51] Int. Cl.$^6$ ........................................ H02H 3/00
[52] U.S. Cl. .................. 361/42; 361/45; 361/115
[58] Field of Search ............... 361/93, 87, 115, 361/42, 45, 18, 100

[56]     References Cited

U.S. PATENT DOCUMENTS

| 3,976,933 | 8/1976 | Banfi ........................... 324/28 R |
| 5,600,524 | 2/1997 | Neiger et al. ..................... 361/42 |

FOREIGN PATENT DOCUMENTS

| 0220408 | 5/1987 | European Pat. Off. ......... H02H 3/04 |
| 4106652 | 9/1992 | Germany ......................... H02H 3/33 |
| 4412305 | 10/1995 | Germany ......................... H02H 3/05 |
| 2056094 | 3/1991 | United Kingdom ............. H02H 3/33 |

OTHER PUBLICATIONS

Siemens Norm 29500, Part 7, "Ausfallraten Von Relais" Apr. 1994.

G. Biegelmeirer, "Schutzmassnahmen In Niederspannungs–Anlagen", Osterreicher Gewerbeverlung, Vienna 1978, pp. 3,5,7–10, 188–235 Apr. 1994.

K.W. Brunner, Dokumentation Bei Prüfungen Nach Din VDE 0100 Und Din VDE 0701:Vorschrift Und Realität, Elektrische Maschinen, 73, pp. 10–12, Apr. 1994.

G. Biegelmeirer, "Gefährliche Körperströme–Berührungsspannungen–Gefahrenschwellen", DE/Der Elektromeister+ Deutsches Elektrohandwerk, DE Aug. 1988, pp. 493–499 Apr. 1994.

Primary Examiner—Jeffrey Gaffin
Assistant Examiner—Stephen Jackson
Attorney, Agent, or Firm—Jay L. Chaskin

[57]       ABSTRACT

An earth-leakage circuit breaker has a totalizing current transformer, a magnetic trip device and switchgear with main current contacts for the main leads. A current-signal generator, a current sensor, a time-signal generator and an electronic timer wherein the switching value and response time of the circuit breaker are measured at predetermined intervals, compared with reference switching values and response times and, if these reference values are exceeded, an alarm is promptly given. During the measurement, a locking device prevents the main current contacts from opening and/or when predetermined limiting switching and response times are exceeded, the locking device opens the main current contacts and subsequently acts as a lock preventing the contacts from closing again, which is equivalent to fail-safe behavior. In addition, the switching value of the circuit breaker is multiplied by its response time and the product, which may exceed a particular constant value, is used for monitoring purposes.

28 Claims, 9 Drawing Sheets

EARTH-LEAKAGE CIRCUIT BREAKER WITH AUTOMATIC MONITORING CAPABILITY

BACKGROUND OF THE INVENTION

The invention relates to an error current circuit breaker.

Error current circuit breakers are house wiring devices intended to protect people from dangerous electric shock and buildings from fires caused by electric wiring. Most of the error current circuit breakers in use today consist of a housing in which a totalizing or summing current transformer, a magnetic relay, a switch gear and a testing means (test key) are accommodated.

It is known that these devices may fail in the course of time. Thus the elements shown to be most vulnerable are the magnetic relay and the testing means. An essential feature of the magnetic relay of an error current circuit breaker is the very small gap between the pole surfaces of its armature and yoke. If after months or years of not being opened, these magnet contacts gradually cold-weld the finely ground pole surfaces, as is known to happen to relays, the response level of the error current citcuit breaker will gradually rise as well, until the weld (a diffusion welding process) is so firm that there is total adhesion of the armature to the yoke. Even in complete absence of permanent magnet flux, the spring action will then not suffice to release the armature, unlock the switch gear, and so interrupt the circuit.

Therefore error current circuit breakers are generally equipped with a test key to be operated manually. There is also a known error current circuit breaker with automatic testing (EP A 0,502,393).

Further, GB A 2,056,094 discloses a device for testing error current circuit breakers, not intended, however, for installation in the circuit breaker.

Most known earth-leakage circuit breakers currently operate independently of the mains voltage (see G. Biegelmeier: "Schutzmassnahmen in Niederspannungs- anlagen" [Protective measures in low-voltage systems]; Österreichischer Gewerbeverlag, Vienna, 1978), but there are also so-called DI circuit breakers, which are mains-dependent earth-leakage circuit breakers. Like circuit breakers independent of the mains voltage, the DI circuit breakers have a totalizing or summing current transformer with a secondary winding, which is connected to mains-dependent evaluation electronics. The advantage of these circuit breakers lies in the fact that they do not require any highly sensitive trip devices, such as the magnetic trip devices. The electronics can supply any desired insensitive relay, which, in the case of a leakage current, trips the switchgear. The switchgear can even be a contactor controlled by this electronics.

Furthermore, European Patent 0,220,408 describes a self-monitoring earth-leakage circuit breaker in which the regular operational test can be omitted, through the fact that the earth-leakage circuit breaker continuously monitors itself throughout the whole operating time. In addition, the earth-leakage circuit breaker also opens in case of interruption of the current supply and does not automatically close again when the current supply is resumed. In this case, the monitoring relates primarily to the electronic circuit. The circuit breaker opens when the rated non-operate current is exceeded. It is not in a position to detect an impending defect.

Earth-leakage circuit breakers with both a manually operable test key and an automatic test key according to German Patent 4,106,652, which, for example, check the mode of operation of the earth-leakage circuit breaker at monthly intervals, have the disadvantage that only a circuit breaker that is no longer tripping, i.e., a circuit breaker that is no longer performing the protective function, is detected. The result of this is that the protection does not exist for weeks, and even months, and the circuit breaker fails in an emergency during this period. Added to this is the fact that only the switching value of the leakage current is checked.

K. W. Brunner, in the journal *Elektrische Maschinen* 73, 10–12 (April 1994), writes that there are reasons for checking not only the switching values but also the response times for the leakage current. These lie, among other things, in the connection between the body current $i_b$ and flow time t in the case of contact with a current-conducting line. As already mentioned, Biegelmeier describes this relationship in detail. It also follows from Diagram 1, which shows the function $I_A = f(\Delta t)$.

The regions of action, shown in the diagram, of a 50/60 Hz alternating current on the human body, according to IEC Report 479, Chapter 2, Second Edition, are as follows:

Region 1 . . . As a rule, no reaction;

Region 2 . . . As a rule, no pathophysiologically hazardous reaction;

Region 3 . . . Transition region without fixed boundaries. As a rule, no organic damage; no danger of ventricular fibrillation, but muscular reactions and respiratory complaints with increasing current strength and duration of action;

Region 4 . . . Increasing probability of ventricular fibrillation (curve $c_2$=probability below 5%, curve $c_3$=probability below 50%). With increasing current strength and duration of action, strong pathophysiological effects, such as cardiac arrest, respiratory arrest, and burns. With respect to ventricular fibrillation, the curves $c_1$ through $c_3$ relate to longitudinal flow from the left hand to the left foot. For durations of actions of less than 200 ms, ventricular fibrillation occurs only in the vulnerable phase, if the threshold values are exceeded.

If the flow time, which is equal to the response time of an earth-leakage circuit breaker, has a value of, for example, 40 ms, then a leakage current of the order of magnitude of 100 to 200 mA, as a rule, does not show any pathophysiologically dangerous action. If, on the other hand, it has a value of $\geq 100$ ms, then a leakage current of 100 to 200 mA would be risky for humans. If it were to have a value of $\geq 500$ ms, then 30 mA would already be risky. It is recognized that the product of the leakage current and response time is of great importance.

BRIEF SUMMARY OF THE INVENTION

The invention is based on the task of creating an earth-leakage circuit breaker in which both the switching value and the response time and also the product of the two can be checked at regular intervals, either by manual operation of a key or a switch or completely automatically, and in which an alarm is given when the reference response values are exceeded.

The invention is also based on the task of creating an earth-leakage circuit breaker for which there is no wait for the detection of a defective circuit breaker, but where an impending defect is already detected before failure of the circuit breaker and an alarm is given in a timely manner, in order to be able to replace the circuit breaker even before its failure.

All known earth-leakage circuit breakers are also burdened by the following disadvantages:

(1) They do not show a fail-safe behavior.

(2) In case of failure of the electrical or electronic control unit, they can not always maintain the earth-leakage protection function.

(3) They do not take into consideration the possibly flowing insulation currents, such as, for example, the capacitive leakage currents.

(4) They do not monitor the main current contacts for welding and/or the switchgear for jamming or the like.

(5) They do not check the opening of the contacts of the magnetic trip device.

(6) They do not check the electronic control unit.

The invention is therefore also based on the task of creating an earth-leakage circuit breaker that possesses these additional properties.

To detect a leakage current in a mains lead, the earth-leakage circuit breaker contains a totalizing or summing current transformer, whose primary winding is formed by the line conductors. The totalizing current transformer also contains a secondary winding in which, upon appearance of a leakage current in the mains, a signal is formed, which causes the earth-leakage circuit breaker to cut out. In this case, the electrical circuit is dimensioned such that the circuit breaker cuts out, for example, within 40 ms at a leakage current of $\leq 30$ mA.

By means of a current-signal generator and current sensor integrated in a microprocessor or microcomputer, a time-signal generator, and an electronic timer, the switching value and the response time are measured and/or multiplied by each other, compared with reference values of the switching currents, response currents, response times, and response products, and, if the reference values are exceeded, a timely alarm is given and, during the measurement, an opening of the current contacts is prevented by means of a locking device. This locking device engages between the switchgear and the magnetic trip device, or directly in the switchgear and prevents the push rod of the magnetic trip device from actuating the switchgear.

In addition, the locking device is designed such that, when predetermined limiting response values are exceeded, it can also serve to open the main current contacts and then serve as a lock preventing them from closing again, which is equivalent to a fail-safe behavior.

To prevent this lock from blocking the leakage-current protective function in case of a defect in the control electronics, the locking device is drawn out of its locking position, for example, by means of an automatically self-releasing spring. However, this does not occur after a fail-safe current switch-off.

If no alarm is given, i.e., the reference response values were not exceeded, then the measured response values are stored and their increase is determined during the next measurement (check). From the increase determined in this way, one can infer the time at which the maximum response values were exceeded, i.e., one can extrapolate and display the time in a suitable manner. As a result, there is sufficient time to replace the earth-leakage circuit breaker in a timely manner.

The predetermined times after which a measurement process is initiated are guided by the magnitude of the response values. If the response value approaches the reference value, then the time intervals after which the next measurements are carried out in each case are reduced automatically.

If not only the response values but also the operability of the whole circuit breaker is to be monitored, then an alarm is given when a specific increase in response value is reached. If the circuit breaker is not replaced after that, then it will open automatically after an also predetermined time, e.g., after 6 to 8 weeks.

If a 300-mA earth-leakage circuit breaker, which is used for fire protection, is involved, 6 to 8 weeks would be much too long, i.e., it must open immediately if a dangerous increase in the tripping time is reached.

A further possibility for monitoring the whole circuit breaker consists of not only giving an alarm when the still allowable response time is reached in each case but also opening the main current contacts and reclosing them within 200 ms. In order for the current to continue flowing while the main current contacts are open in this case, auxiliary current contacts close automatically in a bypass-like manner through these and reopen after the total checking process (measurement process), i.e., after then reclosing of the main current contacts.

If, however, the main current contacts are not to be checked, because, there were very few cases of failure of the switchgears of the earth-leakage circuit breakers in recent years, because resin-forming lubricants were no longer used, only the trip mechanism, e.g., the trip relay, the magnetic trip device, or an actor of a different type, e.g., a piezo actor, responds when the response time is reached. During this process, a locking device prevents a tripping of the switchgear. A current failure during the testing process can be also be avoided in this way.

Because, for example, the magnetic contacts of a magnetic trip device have to be closed again immediately after opening, the locking device has a special form, so that the magnetic contacts close automatically when the locking device is withdrawn.

The locking device that prevents the unlocking of the switchgear can, of course, also be located at a different suitable position, e.g., in the switchgear. In this process, the actual locking device can be driven, for example, electromechanically, electromagnetically, electrothermally, by means of conventional actors, an FGL drive, or the like.

Another development of the invention consists of also detecting with this the increase in the response values of earth-leakage circuit breakers after a short circuit.

For this purpose, an appropriately dimensioned current sensor detects the short-circuit current flowing through the circuit breaker and, by means of a suitable device, initiates the measuring processes described above. In order to prevent these processes from already taking place during overload, it is possible to use, for detection of the short circuit, for example, a Rogowski coil, which does not measure the short-circuit current $i_K$, but its rise $(di/dt)_K$. If the circuit breaker has suffered damage as a result of the short-circuit current, an alarm is given and/or the main current contact is opened.

All of the hardware resulting from the invention can be developed in the form of a conventional auxiliary switch that can be flange-mounted on the earth-leakage circuit breaker. It is also meaningful to monitor all functions of the earth-leakage circuit breaker according to the invention by conventional means, e.g., by means of auxiliary contacts, and, in case of failure, i.e., failure of one or more functions, to give an alarm.

This monitoring, and the evaluation of the switching values, can, according to the invention, also be integrated into a building-system-engineering system that corresponds with other earth-leakage circuit breakers via bus lines and that carries out many of the abovementioned functions in a central manner.

In the monitoring process described above, the limiting response leakage current is set too low, because, normally, certain insulation currents or capacitive leakage currents flow toward the ground, which falsify the test leakage currents generated and measured by the monitoring electronics of the circuit breaker.

This disadvantage is eliminated by the fact that the insulation current is constantly measured and, in the testing or monitoring process, is automatically subtracted from the test leakage current. In this way, the large fluctuations of the response values caused by these leakage currents disappear.

In most earth-leakage circuit breakers, the main current contacts are not checked although—though extremely rarely—for, example, after short circuits, a welding of the main current contacts can take place. The same also applies for the jamming of a switchgear. This would cancel the leakage current protective function, i.e., the circuit breaker would fail in case of a leakage current.

In order to eliminate this disadvantage as well, the mains voltage is constantly automatically measured, directly or, for example, via a series resistor after the contacts and, in case of a leakage current, with non-opening of the main current contacts, a switch-off command is given to a welding-resistant switching unit connected in series before or after the earth-leakage circuit breaker.

To check for a welding of the main current contacts after a short circuit, these must, according to the Invention, open with a time delay, for example, after 20 ms or after the next passage through zero. If they do not open, then a series-connected switching unit switches off and can no longer be switched on (fail-safe behavior).

The measured signal is also processed for optical and/or acoustical signalling, or is transmitted to the central station of a building-system-engineering system.

Another possibility for checking the switchgear for welding of the main current contacts after a short circuit consists of the following:

Because, after a short circuit, the mains voltage is switched off by the corresponding automatic cutout, one or more capacitors are required as intermediate energy-storage devices in order to keep the monitoring electronics of the earth-leakage circuit breaker ready to function. After every short circuit, the leakage current and the response time are checked and the contacts of the switchgear are opened. This can be carried out by generating a leakage current of the order of magnitude of the test leakage current, which causes the magnetic trip device to respond. This opens the switchgear by means of its push rod.

After the circuit breaker has been closed again, the mains voltage measurement after the main current contacts of the earth-leakage circuit breaker indicates whether the contacts are really open. If not, the locking device now tries to open the contacts. If this is unsuccessful (the mains voltage is still displayed), then a switch in the earth-leakage circuit breaker produces a short circuit, which again trips the automatic cutout. This is indicated by the earth-leakage circuit breaker by means of an acoustical and/or optical alarm.

If, against all reason, the automatic cutout should again be closed, then the conductors in the earth-leakage circuit breaker are forced apart or are cut open by means of one or more insulated cutters.

It has not been described so far how the microprocessor learns that the magnetic trip device trips at the predetermined response values. In the simplest case, this takes place by means of auxiliary contacts, as is customary in automatic-circuit-breaker technology. Light barriers, preferably alternating light barriers (reflected-light barriers) are also possible. A more elegant possibility consists of measurement and evaluation of the inductive peak current produced in the secondary winding of the trip device upon opening of the magnetic contacts.

The microprocessor can also correspond with a building-system-engineering system. Also, a part of all electronic functions, such as comparison, storage, and so on, can be taken over by the central station of this system.

BRIEF DESCRIPTION OF THE SEVERAL VIEWS OF THE DRAWING

The invention, and also its advantageous embodiment, will be explained in greater detail and described with reference to drawings.

DETAILED DESCRIPTION OF THE INVENTION

Figure 1:
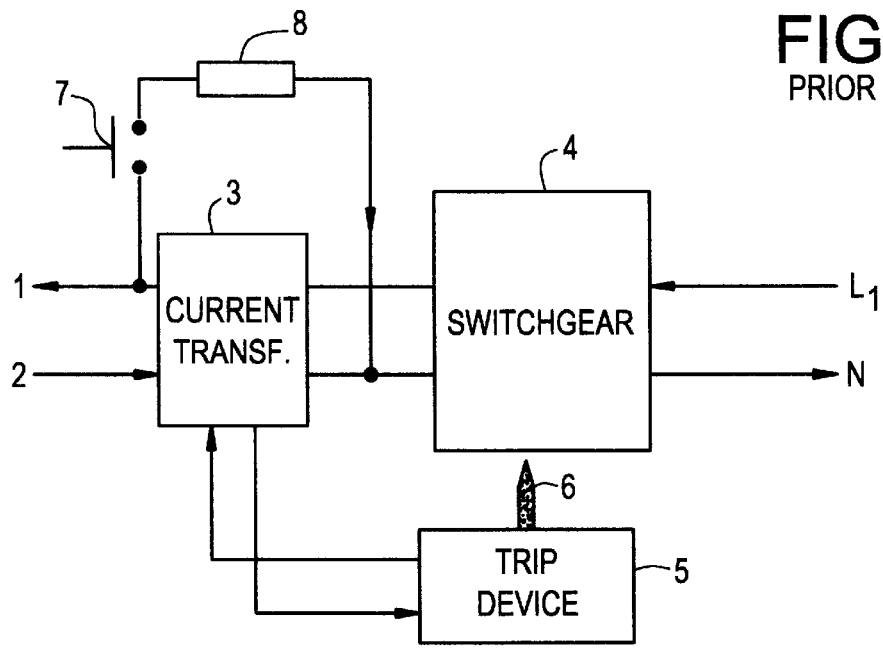
FIG. 1 shows the basic circuit diagram of an earth-leakage circuit breaker with a test key according to the state of the art.

FIG. 1 shows a customary two-pole earth-leakage circuit breaker according to the state of the art. The two mains leads, outer conductor 1 and neutral conductor 2, pass through a totalizing current transformer 3 and a switchgear 4. If a leakage current appears, the transformer 3 generates a signal causing the response of a trip device 5, which, in turn, opens the switchgear 4 by means of a push rod 6 and thereby interrupts the current in the mains leads 1 and 2.

In order to be able to check the good working order of the earth-leakage circuit breaker at regular intervals, a testing device consisting of a test key 7 and a test-resistor 8 is provided. When the test key 7 is depressed, a leakage current flows through the resistor and opens the circuit breaker. After the testing process, the circuit breaker must be closed again manually.

Figure 2:
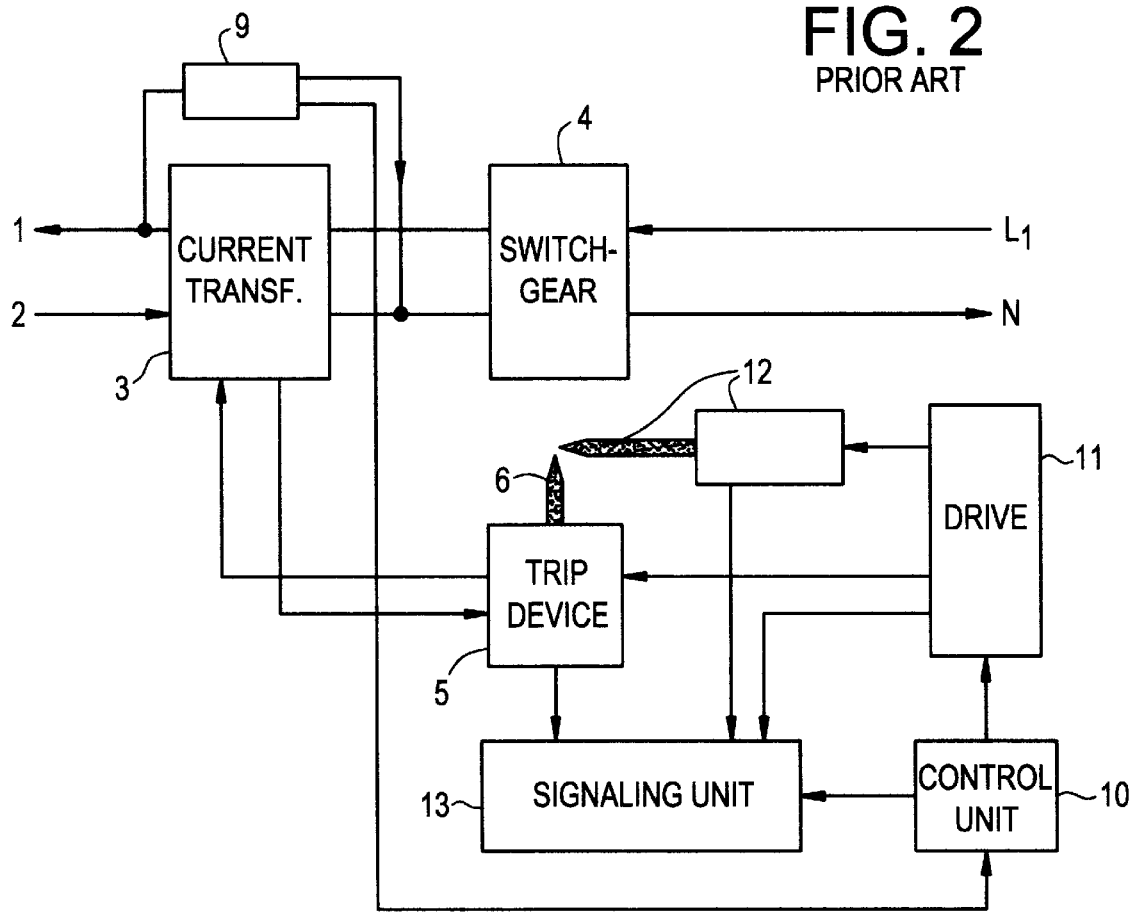
FIG. 2 shows the basic circuit diagram of an earth-leakage circuit breakerwith an automatic test key and switchgear lock according to German Patent 4,106,652.

FIG. 2 shows a two-pole earth-leakage circuit breaker with an automatic test key according to German Patent 4,106,652. In this case, an automatic testing facility 9 is provided, which, shortly before the start of the automatic testing process, transmits a signal to a control unit 10, which pushes a locking device 12 between the push rod 6 of the trip device and the switchgear 4 via a drive 11. This prevents current interruption by the switchgear 4, but not the tripping of the trip device 5. A monitoring and signalling unit 13 automatically monitors the good working order of the individual components and also gives an alarm in case the trip unit 5 does not trip.

Figure 3:
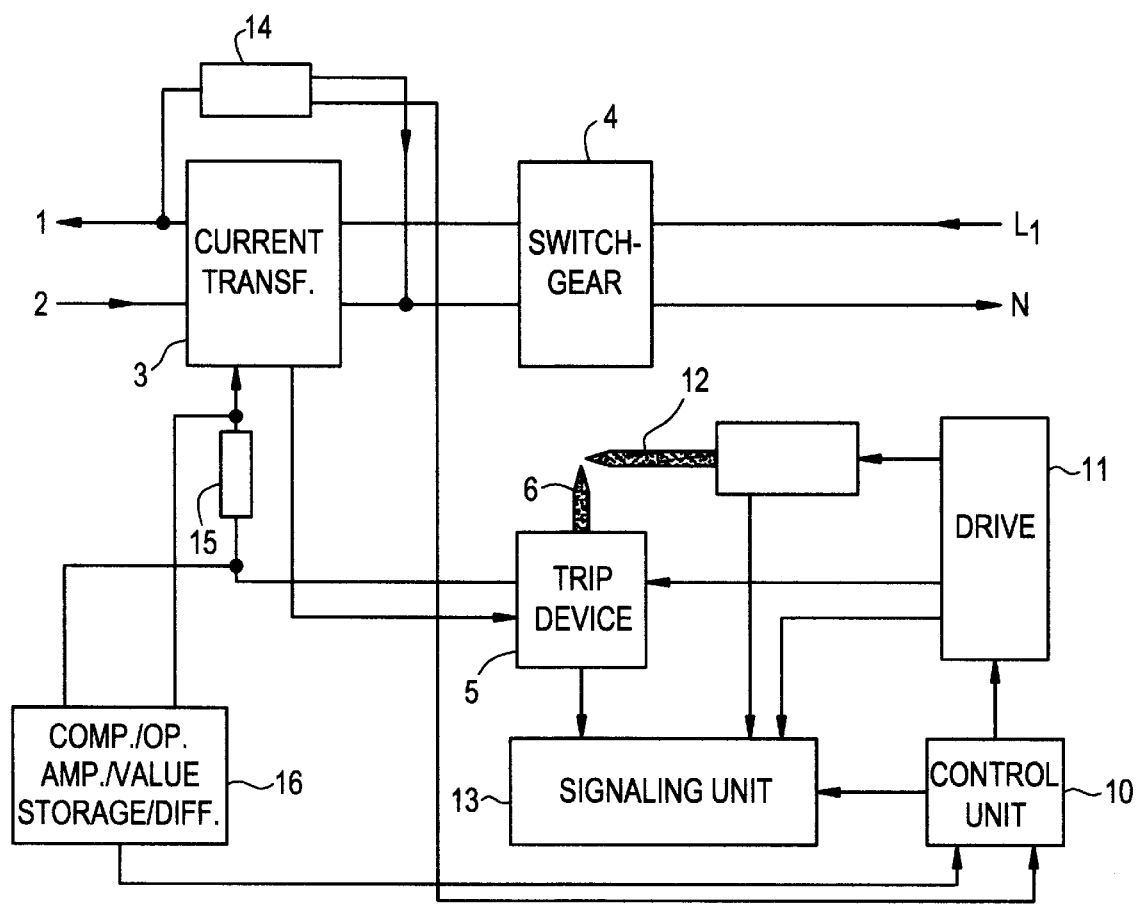
FIG. 3 shows the basic circuit diagram of the earth-leakage circuit breaker in one embodiment of the invention, with a switchgear lock, current-signal generator, current sensor, comparator, operating amplifier, and signalling equipment.

FIG. 3 shows an exemplifying embodiment of the earth-leakage circuit breaker, with the following functional groups: In addition to the elements 1 through 13, which were shown in FIG. 2 and have already been explained, a current-signal generator 14, a measuring resistor 15, and a unit 16, consisting of a comparator, operational amplifier, measured-value storage unit, and differentiating element or differentiator have been added to the circuit. The current-signal generator 14 automatically generates an increasing leakage current at predetermined times, which, after reaching the response value, trips the trip unit 5. During this process, the locking device 12 prevents a shut-off of the current in the mains leads 1 and 2.

A current sensor, in this case the measuring resistor 15, detects the response value by means of a voltage measurement with the use of a sample-and-hold circuit. The comparator of the unit 16 also compares the voltage tapped off from the resistor 15 with the reference response value. All of the response values measured after the predetermined time intervals are stored in a storage unit. All of these operations can, of course, also be carried out with the use of digital technology.

A differentiator in each case determines the increase in the switching values from the momentary and the preceding values, in order to extrapolate from these to the time of failure of the earth-leakage circuit breaker. If an impending defect is detected, the monitoring unit 13 emits an alarm signal and points to this in a display (not shown here). In a further development of the invention, the time (date) at which the circuit breaker should be replaced appears on the display.

Figure 4:
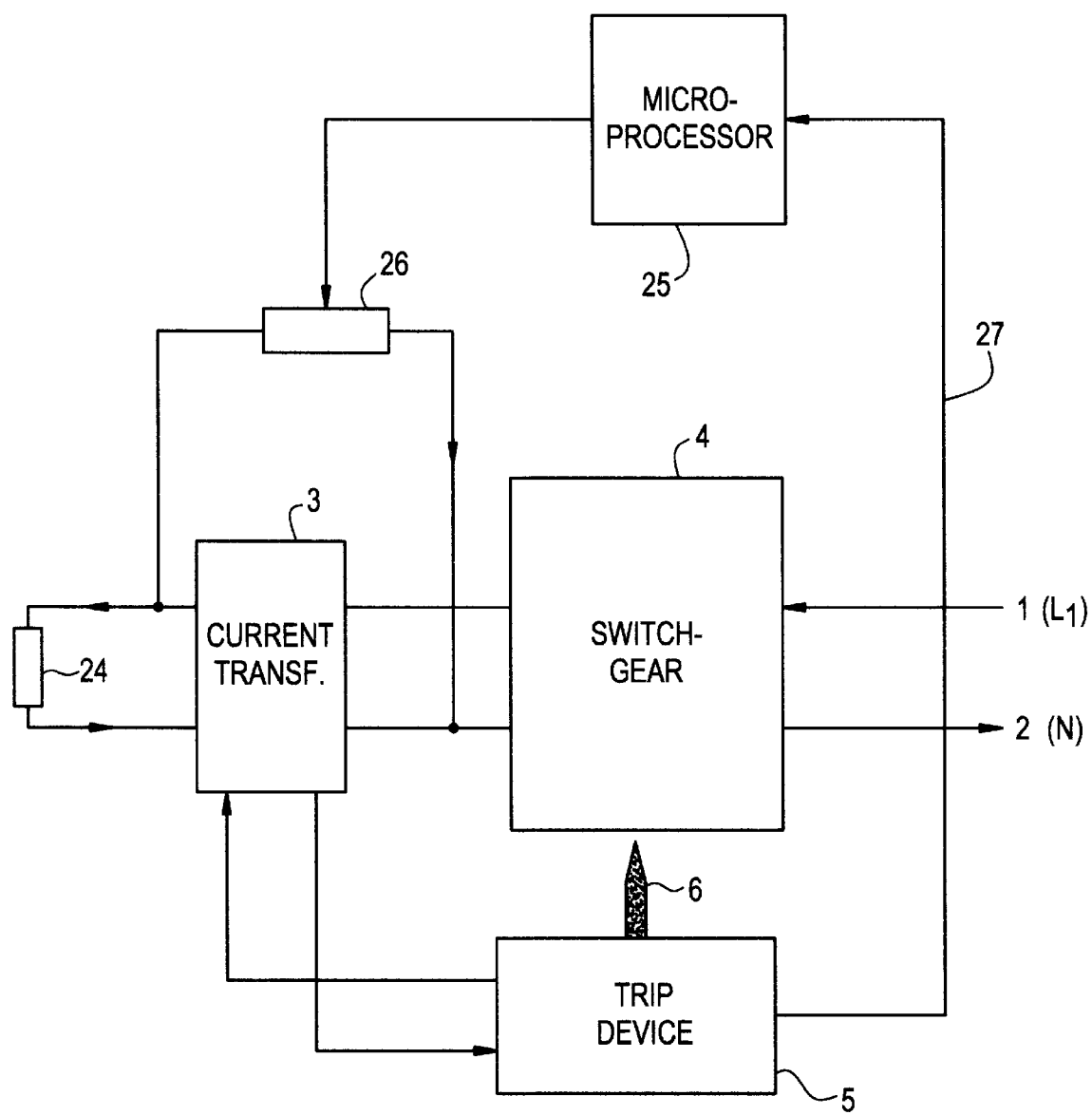
FIG. 4 shows another basic circuit diagram of the earth-leakage circuit breaker according to FIG. 3, but with a time-signal generator.

FIG. 4 shows an exemplifying embodiment of the earth-leakage circuit breaker, without a locking device, which only checks the response time and contains the following functional groups: transformer 3, switchgear 4, trip device 5, push rod 6, load 24, microprocessor 25, and an electronic circuit breaker 26. At preselectable time intervals, a timer integrated in the microprocessor 25 measures the response time of the earth-leakage circuit breaker, which essentially consists of a transformer 3, switchgear 4, and trip device 5, as described above.

The measured response time is compared with the reference response time in the microprocessor 25. When the reference value is exceeded, an optical and/or acoustical alarm is given via an alarm unit (not shown). The microprocessor can, of course, also be included in the central unit of a building-system-engineering system.

A similar procedure is followed with the formation and monitoring of the product of the response time and response current. In detail, the automatic testing process proceeds as follows:

At a time $t_1$, the microprocessor 25 generates a pulse, with which the electronic circuit breaker 26 opens. Through a current-limiting resistor incorporated in this circuit breaker, there then flows a preselectable leakage current, which generates a secondary voltage in the transformer 3 that actuates the trip device 5. The push rod 6 opens the switchgear 4, which closes again within 200 ms by means of a remote control (not shown). Simultaneously with the opening of the switchgear 4, the trip device 5 generates a signal that is reported via a line 27 to the microprocessor 25. If this message does not take place, the microprocessor increases the time until a response of the trip device 5 takes place.

The response time in each case is stored by the microprocessor in an EEPROM, so that the values are not lost in case of current failure. If two or more response times are present, the microprocessor forms the increase in these ($di_\alpha/dt$) and optionally extrapolates to the time at which the reference response time is exceeded. Simultaneously, it gives a silent or loud alarm. If the microprocessor constitutes a component of the central unit of a building-system-engineering system, then this reports the time of the expected exceeding of the reference response time. The circuit breaker can be replaced before it can no longer meet its technical requirements.

Figure 5:
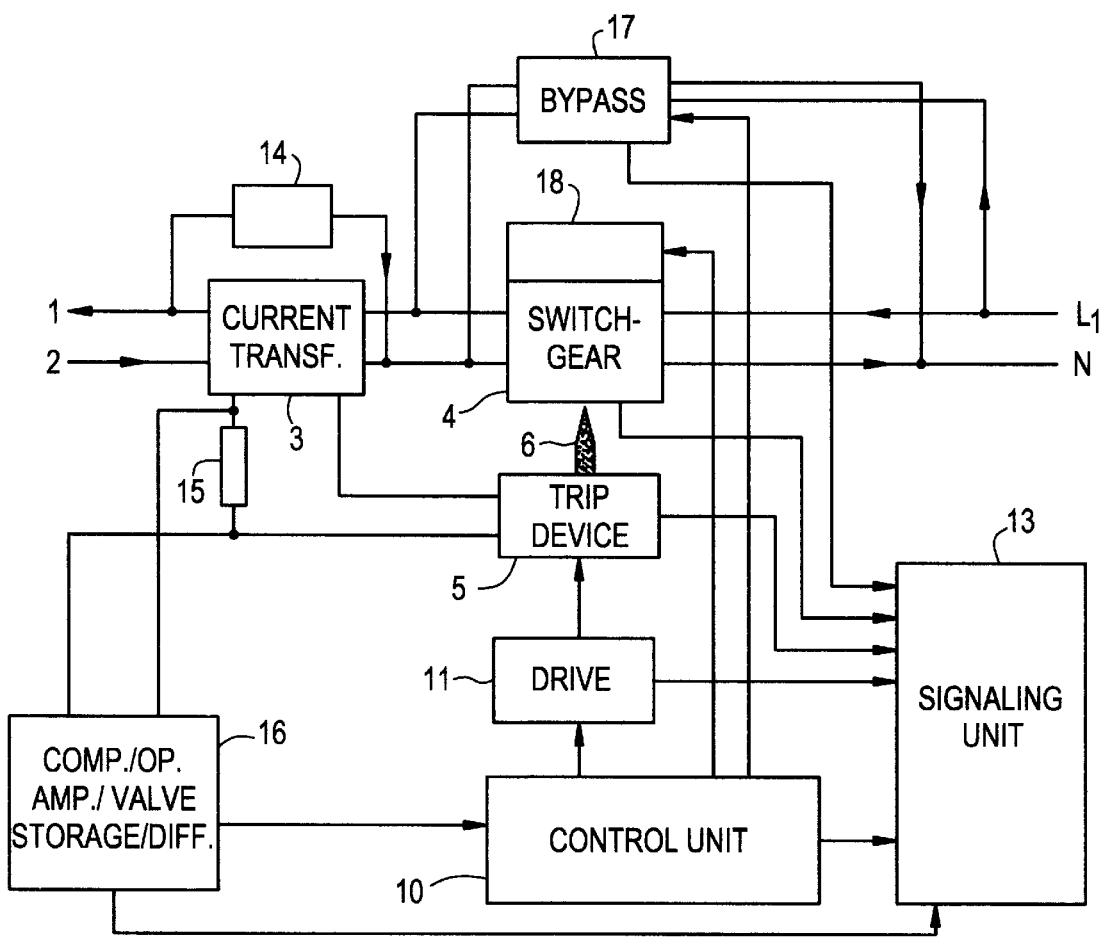
FIG. 5 shows an identical basic circuit diagram of the earth-leakage circuit breaker according to FIG. 3 without a switchgear lock, but with a bypass and switchgear drive.

FIG. 5 shows an exemplifying embodiment without a locking device, but with a bypass 17 and a switchgear drive 18.

In this embodiment, not only is the response value of the trip device 5 determined, stored, and evaluated, but all components, including the switchgear 4, its drive 18, and bypass 17 are monitored at the same time. The mode of operation can be readily derived from the description of FIG. 3.

Figure 6:
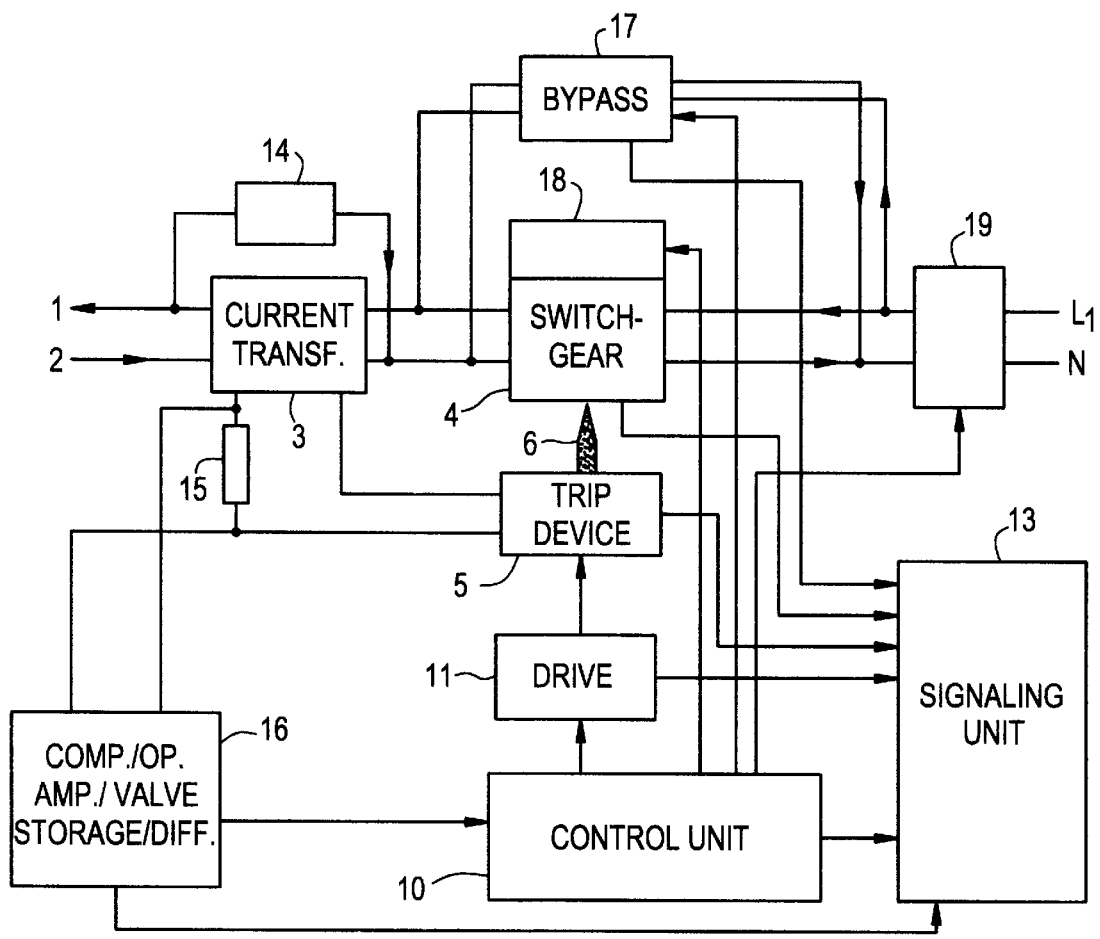
FIG. 6 shows the circuit diagram according to FIG. 5, but with an additional switching unit, which can switch off the current supply mains even in the case of failure of the earth-leakage circuit breaker.

FIG. 6 shows another exemplifying embodiment similar to that of FIG. 5, but supplemented by a switching device 19. This switches off if the earth-leakage circuit breaker has not been replaced after a predetermined time, determined from the increase in the response value (fail-safe behavior).

FIG. 7, which is made up of four figures, FIG. 7a through FIG. 7d, which show one of many conceivable embodiments of the locking device 12 and its drive 11, which, in the case of some of the exemplifying embodiments mentioned above, inserts itself between the push rod 6 and the switchgear 4 and, upon withdrawal, automatically closes, for example, the magnetic contacts of the magnetic trip device 5.

Figure 7A:
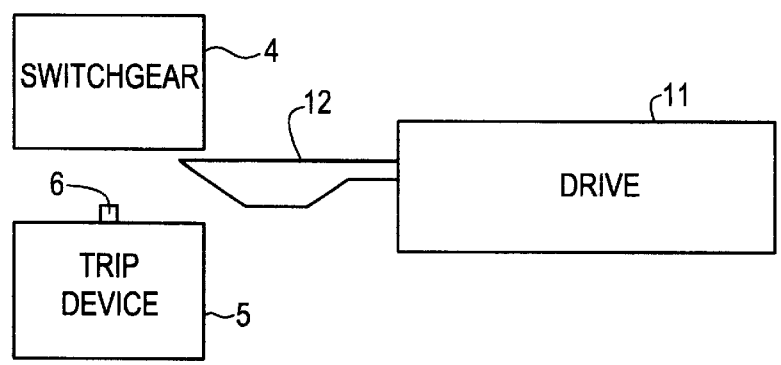
FIG. 7 shows an exemplifying development of a switchgear lock.

In this figure, FIG. 7a represents the starting phase of the monitoring process. The push rod 6 of the trip device 5 and the locking device 12 are in a stand-by position, i.e., in the retracted state. It can be seen that the locking device 12, which is spoon-shaped, can shoot past the push rod 6.

Figure 7B:
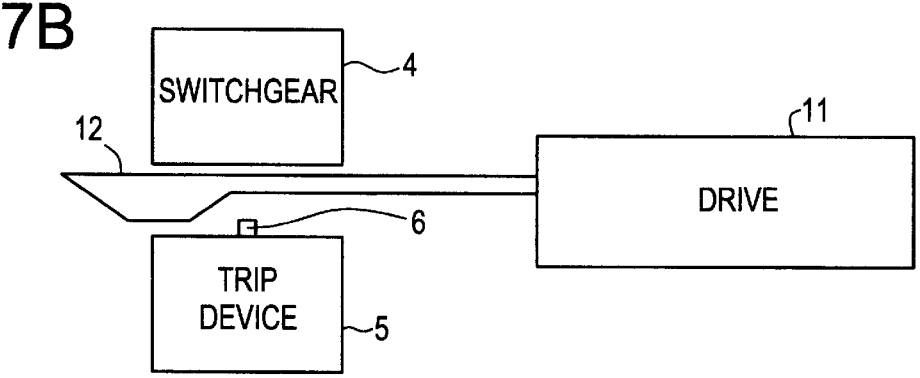

FIG. 7b shows the locking device 12 in a position in which it is no longer possible to switch off the switchgear 4.

Figure 7C:
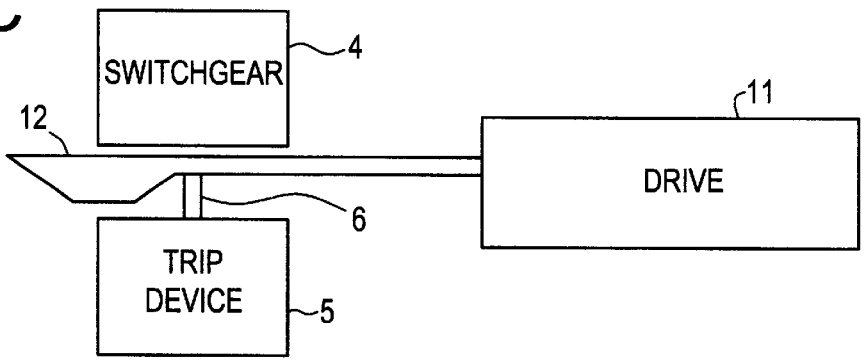

If the response value is now measured and the trip device 5 trips during this process, then the push rod 6 will strike against the locking device 12, as shown in FIG. 7c.

Figure 7D:
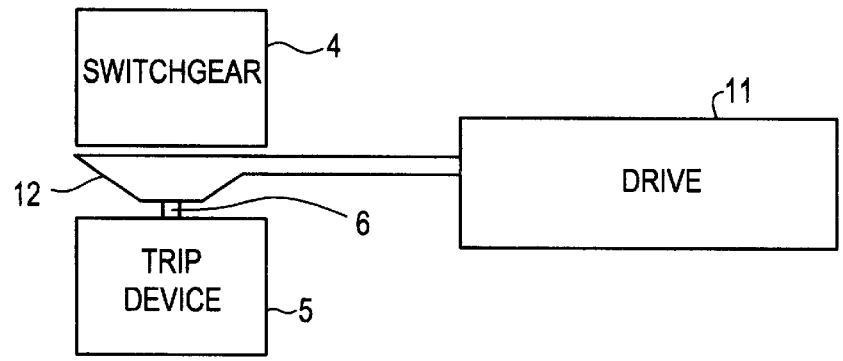

After completion of the process, the locking device 12 retracts and, with its thickened part, pushes the push rod 6 in a downward direction, as can be seen from FIG. 7d, and the push rod, in turn, recloses the magnetic contacts of the trip device 5.

After closing of the magnetic contacts, the locking device 12 again returns to its starting position according to FIG. 7a.

The different tasks of the locking device 12 and their executions are shown in FIGS. 8a through 8e.

Figure 8A:
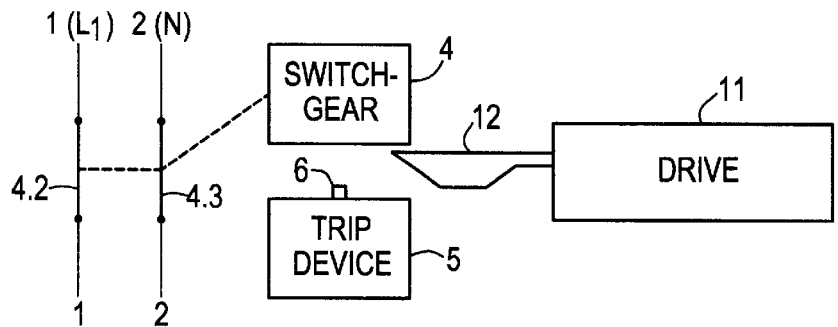
FIG. 8 shows another exemplifying form of the switchgear lock or the locking device.

FIG. 8a shows the locking device 12 with the drive 11 in the starting position. The main current contacts 4.2 and 4.3 of the switchgear 4, which can separate the mains leads 1, 2, and the magnetic contacts of the magnetic trip device are still closed in this case. The push rod 6 which can open the switchgear 4 for the purpose of opening the main current contacts 4.2 and 4.3, is also still located in the starting position.

Figure 8B:
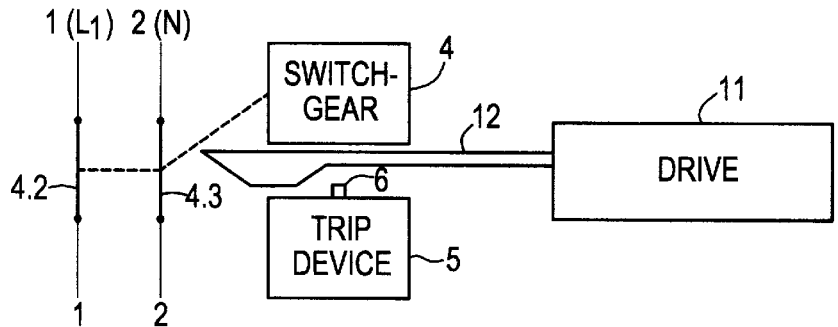
Figure 8C:
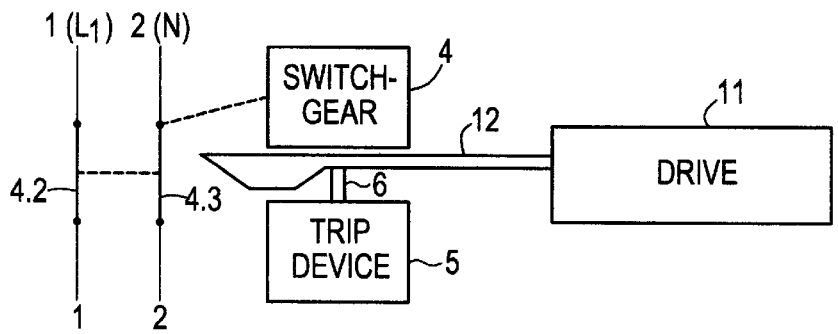

If the command to initiate the monitoring process is now received from the timing clock of the microprocessor, the locking device 12 first moves between the trip device 5 and switchgear 4 (FIG. 8b). Immediately after that, the magnetic trip device 5 is tripped and the push rod 6 strikes the locking device 12, which prevents the opening of the switchgear 4 and thus prevents the opening of the main current contacts 4.2 and 4.3 (FIG. 8c).

Figure 8D:
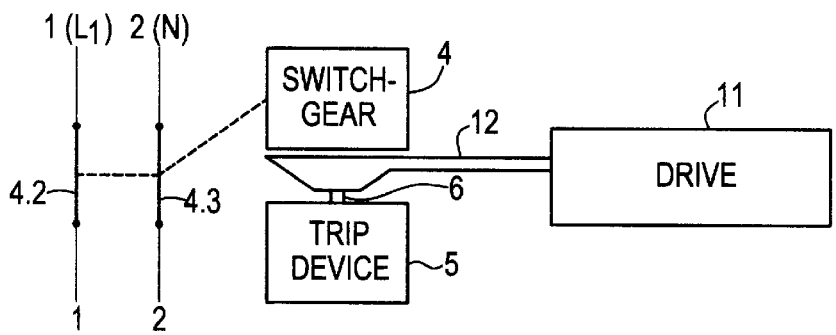

After completion of the monitoring process, the locking device 12 retracts and, through its special shape, closes the magnetic contacts of the magnetic trip device 5, by pressing the push rod 6 in a downward direction (FIG. 8d).

Figure 8E:
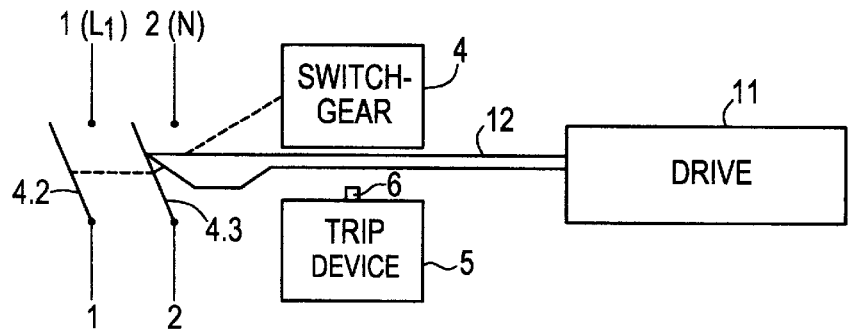

If it has been found during the checking of the switching value and the response time that the these are too high in the sense of a leakage-current protection, then the locking device 12 moves through between the switchgear 4 and trip device 5 and thereby opens the main current contacts 4.2 and 4.3, and remains in this position, so that the contacts can no longer close (FIG. 8e).

If necessary, the magnetic trip device is closed by means of an additional switching process of the locking device 12, so that the magnetic contacts can not become dirty.

Figure 9:
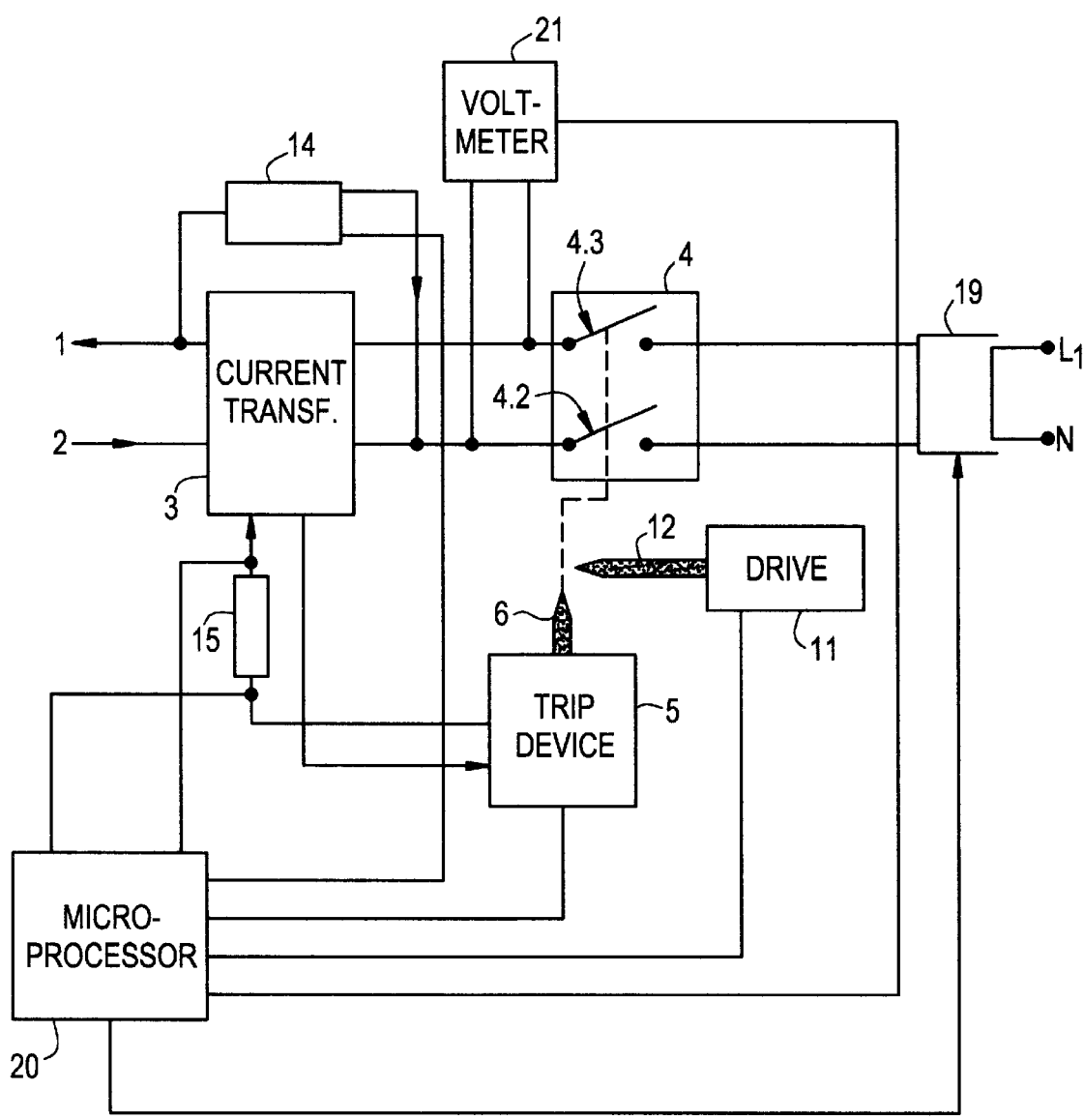
FIG. 9 shows the basic circuit diagram of another embodiment of the earth-leakage circuit breaker, with equipment for the detection of weldings of the main current contacts and a facility for fail-safe behavior.

FIG. 9 shows the basic circuit diagram of the earth-leakage circuit breaker, with a facility for the detection of weldings of the main current contacts and with a fail-safe behavior. The two mains leads, outer conductor 1 and neutral conductor 2, pass through the totalizing current transformer 3 and the switchgear 4. If a leakage current appears, the transformer 3 generates a signal causing a response of the trip device 5, which, in turn, opens the switchgear 4 by means of the push rod 6 and thus interrupts the current in the mains leads 1 and 2.

For the monitoring of the switching value, there is located, connected to the secondary winding of the totalizing current transformer 3, a measuring resistor 15, which, like all other components, is connected to a microprocessor 20.

The current-signal generator 14 automatically generates, at predetermined times, an increasing leakage current, which, after reaching the response value, causes the trip device 5 to trip. In this case the locking device 12, as already described, prevents the switch-off of the current in the mains leads 1 and 2. A current sensor, in this case the measuring resistor 15, records the response value by means of a voltage measurement, for example, with the use of a "sample and hold circuit." In addition, the comparator of the unit 20 compares the voltage picked off from the resistor 15 with the reference response value. All of the response values measured after the predetermined time intervals are stored in a storage unit. All of these operations are, of course, carried out in the microprocessor 20.

In each case, a differentiator determines the increase in the current response values from the momentary and preceding values, in order to extrapolate from these to the failure time of the earth-leakage circuit breaker. If an impending defect is detected, the monitoring unit in the microprocessor 20 gives off an alarm signal and indicates this in a display (not shown here). In a further development, the time (date) at which the circuit breaker should be replaced appears on the display.

To monitor the response time, the response time of the earth-leakage circuit breaker is measured at predetermined intervals by means of a time-signal generator integrated in the microprocessor 20, compared with a reference response time, and, if the latter is exceeded, an alarm is given.

If no alarm is given, then the measured response time is stored and its increase is determined during the next measurement (test). From the increase determined in this way, the time at which the maximum reference response time is exceeded can be inferred, i.e., it can be determined by extrapolation, and can be displayed in a suitable manner. This results in sufficient time for having the earth-leakage circuit breaker replaced in a timely manner.

Because the response time can be different from one circuit breaker to another—for example, it must have a value of between 0 and 500 ms for "30-mA" circuit breakers—leakage currents of increasing duration are produced by the microprocessor 20 until these reach the response time.

The predetermined times after which a measuring process is initiated in each case are guided by the magnitude of the response time. If the response time approaches the reference value, then the time intervals after which the next measurements are carried out in each case decrease automatically.

In order to be able to also indicate the welding of the contacts 4.2 and 4.3 after a short circuit, a voltmeter 21 is arranged beyond these, which is also connected to the microprocessor 20.

As already described for FIG. 8e, the locking device 12 is intended to open the main current contacts 4.2 and 4.3 if, in the check of the switching value and the response time, it is found that these are too high in the sense of a leakage-current protection. If the contacts are welded or the switchgear is jammed, the fact that the locking device 12 is unable to do this is immediately transmitted by the voltmeter 21 to the microprocessor 20, which causes the opening of the switching device 19.

Figure 10:
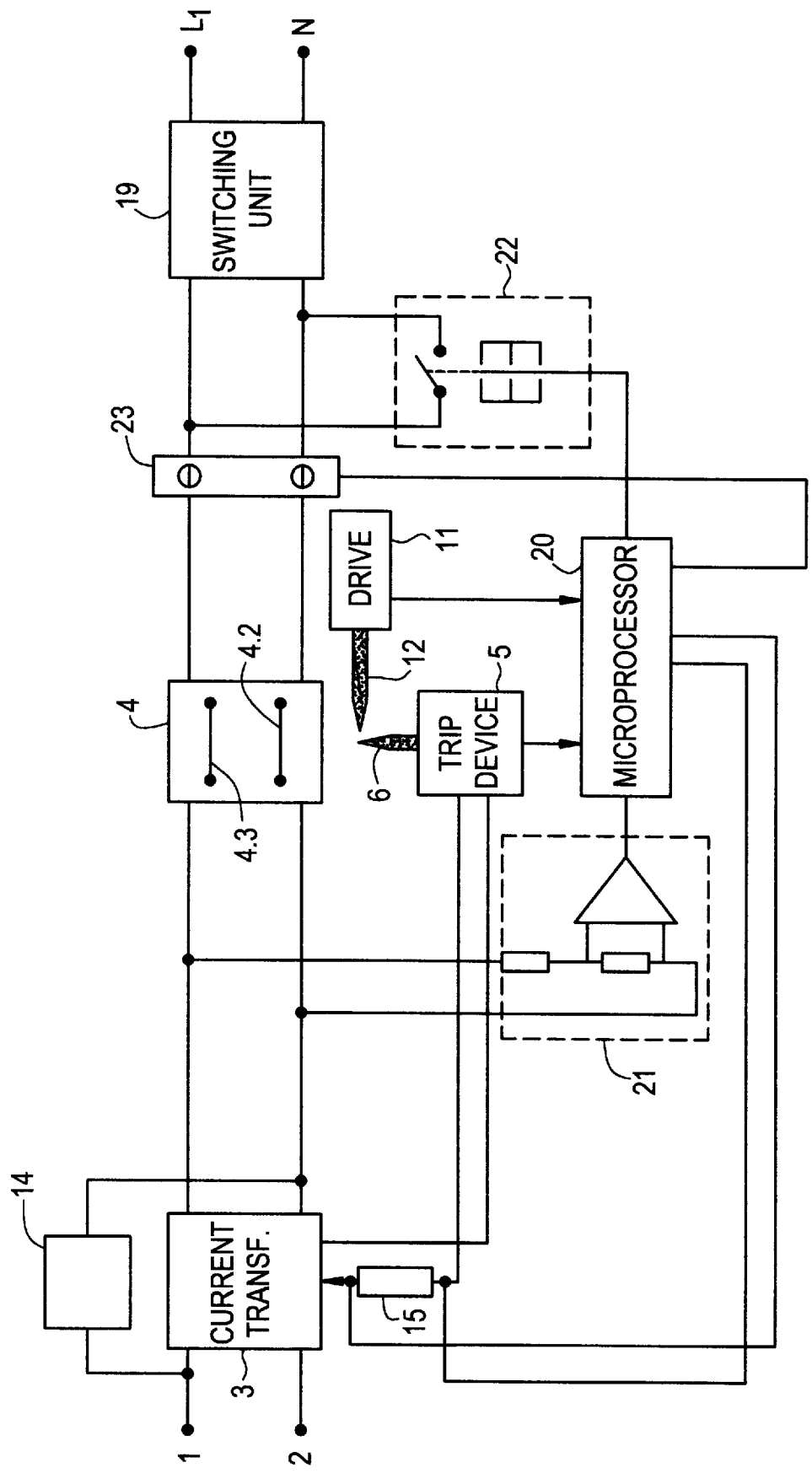
FIG. 10 shows a modified circuit diagram of the earth-leakage circuit breaker with a short-circuit switch and detonating caps or cutters.

FIG. 10 shows another exemplifying embodiment of the earth-leakage circuit breaker. If it is found during the automatic checking of the response values that these have exceeded their reference values, and that the circuit breaker has not been replaced despite an optical and/or acoustical warning, then the push rod 6 of the trip device 5 opens the contacts 4.2 and 4.3 of the switchgear 4. If these are welded or jammed, which is determined by means of the voltmeter 21, then the microprocessor 20 closes a relay 22 and thereby trips the switching unit 19. If, contrary to expectations, this is closed again without replacing the earth-leakage circuit breaker, then the leads are automatically capped with the use of the component 23, which can be carried out, for example, with the use of an insulated cutter or a miniature detonating cap.

Various modifications in structure, function or steps may be made to the disclosed invention by one skilled in the art.

What is claimed is:

1. Earth-leakage circuit breaker having an automatic monitoring capability and a current summing transformer, a magnetic trip device, and a switchgear having main current contacts for the main leads, wherein the circuit breaker switching value and response time at predetermined time intervals is measured by means of a current-signal generator, a current sensor, a time-signal generator, and an electronic timer compares these measurements with reference response times and reference response currents and gives a timely alarm when the reference values are exceeded, and, during the measurement, prevents opening of the main current contacts by means of a locking device wherein the locking device is designed such that after predetermined limiting response values are exceeded opens the main current contacts and can then act as a lock to prevent the main current contacts from closing again, which is equivalent to fail-safe behavior.

2. Earth-leakage circuit breaker according to claim 1, wherein the switching value is multiplied by the response time and that the product of the two, which must not exceed a specific constant value is used for the monitoring.

3. Earth-leakage circuit breaker according to claim 1 wherein a retraction of the locking device again closes the contacts of the magnetic trip device.

4. Earth-leakage circuit breaker according to claim 1 having control electronics wherein the locking device, in case of a defect in the control electronics, is retracted by means of a spring, in order to preserve the leakage current protective function, but not after a fail-safe current-protective switching operation.

5. Earth-leakage circuit breaker according to claim 1 wherein all of the response values measured at specific time intervals are stored and, from the automatically formed increase of the response values with time, the time at which the reference response values are exceeded is inferred.

6. Earth-leakage circuit breaker according to claim 1 wherein the response value is reached by means of a simulated increasing leakage current, during which the increasing current is generated by means of a ramp generator.

7. Earth-leakage circuit breaker according to claim 1 wherein the length of the predetermined time intervals is guided by the magnitude of the measured response value in each case when the response value approaches the reference value, the time intervals become increasingly shorter.

8. Earth-leakage circuit breaker according to claim 1 wherein when a specific value of the increase is reached, either or both an alarm is given and the main current contacts are opened and are immediately closed again automatically.

9. Earth-leakage circuit breaker according to claim 1 wherein before opening of the main current contacts a bypass-similar auxiliary current contacts automatically switch through the main current contacts which open after the reclosing of the main current contacts no current failure takes place.

10. Earth-leakage circuit breaker according to claim 1 wherein the locking device is driven electromechanically or electromagnetically or electrothermally, with the use of conventional means.

11. Earth-leakage circuit breaker according to claim 1 wherein the time that elapses before the earth-leakage circuit breaker is again ready for operation is less than 200 ms.

12. Earth-leakage circuit breaker according to claim 1 wherein the measuring and monitoring facility has the form of an auxiliary switch unit that can be flange-mounted on the earth-leakage circuit breaker.

13. Earth-leakage circuit breaker according to claim 1 wherein all functions are monitored by by auxiliary contacts, and, in case of failure of one or more functions, an alarm is given.

14. Earth-leakage circuit breaker according to claim 1 wherein the monitoring control and signalling are integrated into a building-system-engineering system.

15. Earth-leakage circuit breaker according to claim 1 wherein either a welding or of the main current contacts after a short circuit is detected by a measurement of the mains voltage by means of a voltage divider or series of resistor beyond the contacts.

16. Earth-leakage circuit breaker according to claim 1 wherein after detection of the non-opening of the main current contacts, a switching unit connected in series before or after the earth-leakage circuit breaker switches off.

17. Earth-leakage circuit breaker according to claim 1 wherein after a short circuit as a result of natural or circuit originated causes after the opening of an automatic cutout connected in series with the earth-leakage circuit breaker, a time-delayed opening of the main current contacts takes place.

18. Earth-leakage circuit breaker according to claim 1 wherein either or both a possibly flowing insulation current and capacitive leakage current are subtracted from both the test leakage current and the leakage current.

19. Earth-leakage circuit breaker according to claim 1 wherein either or both the insulation current and the capacitive leakage current are constantly monitored.

20. Earth-leakage circuit breaker according to claim 1 wherein to check the opening of the magnetic trip device a peak inductive current that is produced in a coil of the trip device during opening of the magnetic contacts is measured and evaluated.

21. Earth-leakage circuit breaker according to claim 1 wherein a defect in the control electronics is displayed by a red LED.

22. Earth-leakage circuit breaker according to claim 1 wherein a microprocessor or a microcomputer monitors the switching values, response times, and the product of the two and takes over all other electronic functions.

23. Earth-leakage circuit breaker according to claim 1 wherein the whole monitoring process is carried out automatically.

24. Earth-leakage circuit breaker according to claim 1 wherein the circuit breaker can only be closed again if either or both an automatic cutout and an additional switching unit have been previously closed and at the mains voltage.

25. Earth-leakage circuit breaker according to claim 1 wherein in case of a failure of the main current contacts, a switch produces a short circuit that trips an automatic cutout connected in series before or after the switch.

26. Earth-leakage circuit breaker according to claim 22 wherein after the opening of the automatic cutout, at least one intermediate energy storage unit is available, which keeps the monitoring electronics ready for operation.

27. Earth-leakage circuit breaker according to claim 1 wherein in an emergency situation, the main leads are opened by means of one or more insulated cutters or are separated by means of a miniature detonating cap.

28. Earth-leakage circuit breaker according to claim 1 wherein in case of failure of the leakage-current protection function the main leads are separated by force by means of insulated cutters or with a miniature detonating cap.

* * * * *